United States Patent [19]

Percec

[11] Patent Number: 4,806,601
[45] Date of Patent: Feb. 21, 1989

[54] POLYARYLENE POLYETHERS WITH PENDANT VINYL AND ETHYNYL GROUPS AND PROCESS FOR PREPARATION THEREOF

[75] Inventor: Virgil Percec, Pepper Pike, Ohio

[73] Assignee: The B. F. Goodrich Company, Akron, Ohio

[21] Appl. No.: 948,245

[22] Filed: Dec. 31, 1986

Related U.S. Application Data

[62] Division of Ser. No. 669,641, Nov. 8, 1984, Pat. No. 4,634,742.

[51] Int. Cl.$^4$ ............................................. C08F 283/08
[52] U.S. Cl. ...................................... 525/391; 525/392; 525/534; 525/535; 528/171; 568/33; 568/49; 568/636
[58] Field of Search ................ 528/171; 525/391, 392, 525/534, 535; 568/33, 49, 636

[56] References Cited

U.S. PATENT DOCUMENTS

| | | | |
|---|---|---|---|
| 3,356,761 | 12/1967 | Fox ........................................ | 525/391 |
| 4,048,143 | 9/1977 | Hay et al. .............................. | 525/390 |
| 4,431,761 | 2/1984 | Hergenrother ....................... | 525/534 |
| 4,510,296 | 4/1985 | Hergenrother ....................... | 525/534 |
| 4,562,243 | 12/1985 | Percec ................................. | 525/534 |
| 4,634,742 | 1/1987 | Percec ................................. | 525/534 |

FOREIGN PATENT DOCUMENTS 2020296 11/1979 United Kingdom ................ 525/392

*Primary Examiner*—Maurice J. Welsh
*Assistant Examiner*—S. A. Acquah
*Attorney, Agent, or Firm*—Alfred D. Lobo

[57] ABSTRACT

A method for the synthesis of polyarylene polyether (PAPE) oligomers with pendant vinyl groups is presented. Aromatic polyether sulfone (APS) and poly(2,6-dimethyl-1,4-phenylene oxide) (PPO) backbones are used for specific examples. Terminal vinyl groups may also be provided on the APS by forming the α, ω-di(-benzyl)APS before the first step of a synthesis to form a pendant groups which step involves the chloromethylation of APS and PPO to provide oligomers with chloromethyl groups. PPO containing bromomethyl groups was obtained by radical bromination of the PPO methyl groups. Both chloromethylated and bromomethylated starting materials are converted to their phosphonium salts, and then subjected to a phase transfer catalyzed Wittig reaction to provide the pendant vinyl groups. An APS containing pendant ethynyl groups is prepared by bromination of the APS with pendant vinyl groups, followed by a phase transfer catalyzed dehydrobromination. Differential scanning calorimetry analysis of the thermal curing of the oligomers containing pendant vinyl groups, and, ethynyl groups, showed that the curing reaction is much faster for the former. The resulting network polymers were flexible when the starting oligomer contained pendant vinyl groups, and very rigid when it contained pendant ethynyl groups.

55 Claims, No Drawings

POLYARYLENE POLYETHERS WITH PENDANT VINYL AND ETHYNYL GROUPS AND PROCESS FOR PREPARATION THEREOF

This is a division of application Ser. No. 669,641, filed Nov. 8, 1984, now U.S. Pat. No. 4,634,742, issued Jan. 6, 1987.

BACKGROUND OF THE INVENTION

The elegant demonstration by Milkovich et al that graft copolymers can be prepared by the copolymerization of macromonomers with conventional small monomers has initiated a spate of publications in this field. Particular interest has been focussed upon the radical polymerizations of vinyl monomers because it was expected that the rate of polymerization and the degree of polymerization on the molecular weight ($\overline{Mn}$) of the growing polymer may be substantially the same as that of conventional vinyl monomers. Both the rate and the degree of polymerization are generally quite high for vinyl monomers which are therefore of major economic interest. The realization that a large moiety adjacent the vinyl head group often reduces the rate of polymerization of the macromer because of the relatively low molar concentration of reactive end groups, particularly at high conversions where also the increased viscosity of the reaction mass reduces the diffusion of the macromer to the reaction site, has done nothing to dull this interest.

In particular, functional polymers having either pendant or terminal triple bonds have received much attention recently, and especially the latter, because of their potential use in the development of matrix resins for lightweight composite materials. Thermal curing based on the properties of triple bonds is characteristically free of evolution of volatile byproducts, wherein lies their advantage. A review article titled "Acetylene Containing Precursor Polymers" by P. M. Hergenrother, *J. Macromol. Sci-Rev. Macromol. Chem.*, C19(1), 1–34 (1980) discloases a variety of acetylenic polymers. Despite this interest and the known advantage (see P. M. Hergenrother, *J. Polym. Sci., Polym. Chem. Ed.*, 13, 1095, 1980; and, id. 20 3131, 1982) the only publications dealing with pendant ethynyl groups are on aromatic polyetherketone-sulfones (see "Aromatic Polyethers, Polysulfones, and Polyketones as Laminating Resins. V. Polymers Containing Acetylenic Side Groups" by C. Samyn and C. S. Marvel, *J. Polym. Sci., Polym. Chem. Ed.*, 13, 1095, 1975), and "Sulfone-Ester Polymers Containing Pendant Ethynyl Groups" by B. J. Jensen and P. M. Hergenrother, *Polymer Preprints* 25 No. 2, August 1984. The Samyn et al procedure relies on converting acetyl groups introduced in the backbone into acetylenic groups, is far less convenient than the process I have outlined herein, and the materials produced starting with 2,4-diphenoxyacetophenone in the backbone are unlike the ones produced by my process.

A three-step procedure for the synthesis of acetylene terminated polymers is disclosed in Report AFWAL-TR-83-4159 titled "Low Cost Acetylene Terminated Polymers" by J. F. Prescott et al, issued by Air Force Wright Aeronautical Laboratories, in which synthesis palladium and copper must be disposed of.

The particular interest of my invention is to tailor a polyarylene polyether ("PAPE") oligomer with pendant vinyl or ethynyl groups, or a PAPE oligomer which may have both pendant and terminal vinyl or ethynyl groups, all referred to herein as "functional" groups. Such an oligomer was deemed desirable not only because it should be thermally crosslinkable through its vinyl groups, or ethynyl groups, but because it might also melt at a temperature in the range from about 200° C. to about 300° C., yet be capable of withstanding thermal degradation at a temperature in the range from above 300° C. to about 400° C.

This invention is more particularly related to polyfunctional polymers of dihydroxybenzene, dihydroxynaphthalene, and diphenols, all referred to herein as dihydric phenols (DHP), and the corresponding sulfur (thio) compounds referred to as polydihydric thiophenols (DHTP); and, of 2,6-dimethylphenol (DMP) and like 2,6-disubstituted phenols referred to herein as mononuclear monohydric phenols (MHP). These polymers have a $\overline{Mn}$ (number average mol wt) less than about 50,000, hence termed oligomers. They are relatively low $\overline{Mn}$ known polymers (oligomers) which are analogous to the relatively high $\overline{Mn}$ PAPEs disclosed in U.S. Pat. No. 4,108,837 relevant portions of the disclosure of which are incorporated by reference thereto as if fully set forth herein. By "polyfunctional oligomers" I refer to those having at least two, and preferably up to about 12 pendant vinyl or ethynyl groups per oligomer; and, optionally, such oligomers may additionally also include at least one terminal vinyl or ethynyl group. For example, poly(2,6-dimethyl-1,4-phenylene oxide) (PPO) will have only one terminal functional group, but may have plural pendant groups.

One or the other DHP and DHTP, or both, are referred to herein as "DH(T)P" for brevity. Such oligomers are defined herein as polymers containing from 2 to about 100 repeating units each having the formula $-[DH(G)P\ R^s]-$, where $R^s$ represents the residue of a linking group. These oligomers contain at least three phenyl or thiophenyl rings which may have inert substituents, each ring linked to another through an O, Si, C or S atom. Such DHP and DHTP oligomers, also termed poly[DH(T)P], or $[DH(T)P]_n$, are terminated at each end (hence "di-terminated") with a phenol (Ph) or thiophenol (TPh) group respectively, or with a chlorophenyl or bromophenyl, hence halophenyl (HPh) group, any of which groups may have inert substituents. For brevity, "di-(T)Ph-terminated" refers herein to either or both oligomers which are Ph- and TPh-terminated respectively; and "di-HPh-terminated" refers to oligomers which are terminated at each end with a halophenyl group.

Various considerations relating to providing a di-(T)Ph-terminated poly[DH(T)P] with functional vinyl or ethynyl terminal (end) groups are set forth in my copending patent application Ser. No. 586,678 filed Mar. 7, 1984 the disclosure of which is incorporated by reference thereto as if fully set forth herein; and in references cited in the application, relevant portions of which references are similarly incorporated. As in that invention, the DH(T)P reactant(s) herein are poorly soluble in commonly available organic solvents, and anhydrous DMSO or other aggressive solvent, is used for preparation of the poly[DH(T)P] oligomer, particularly where two DH(T)P are polycondensed, for example, 4,4'-isopropylidenediphenol (also, 2,2-bis(4-hydroxyphenyl) propane, or bisphenol A, BPA) and 4,4'-dichlorodiphenyl sulfone DCPS derived from diphenyl sulfone DPS. The reaction is very fast, and the nucleophilic displacement step-growth polymerization quickly reaches relatively high mol wt in the range from about 1000 to about 20,000, and 100% yield. The polymer weight is relatively independent of the ratio between the nucleophilic and electrophilic reactants. Most importantly, the organic-soluble polymer obtained may be made with only electrophilic species as chain ends, independent of the reaction yield but dependent upon the reactant ratio. Such poly[DH(T)P] are particularly well suited for being modified to contain only pendant vinyl or ethynyl groups, or both pendant and at least one terminal vinyl or ethynyl group per oligomer chain.

Analogously, an oligomer [MHP]$_n$ formed from a MHP contains from about 2 to about 100 repeating units, each having the formula $-$[MHP-R$^s$]$-$, where R$^s$ represents the residue of a linking group. A [MHP]$_n$ contains at least three phenyl rings, each with 2,6-inert substituents, each ring linked to another through an O atom, and plural pendant groups in each chain.

My invention is particularly directed to (a) polyfunctionalizing an oligomer of at least one mononuclear or polynuclear DH(T)P, formed by a condensation reaction with a reactive linking group resulting in a repeating unit in which two, same or different, DH(T)P moieties are connected with a linking residue R$^s$; and, (b) polyfunctionalizing a [MHP]$_n$, specifically PPO. Chloromethylation is a first step when only pendant functional groups are desired. When both terminal and pendant groups are desired in a [DH(T)P]$_n$ one preferably commences with the bisphenolate salts which are essentially insoluble at room temperature, or only soluble in aggressive solvents such as dimethyl sulfoxide (DMSO) at elevated temperatures in the range from about 70° C. to about 150° C. The first step is methylarylation, preferably benzylation, of the PAPE's chain ends, followed by halomethylation and subsequent polyfunctionalization. As defined herein, Ph-terminated polyphenylene (PP) is an oligomer of a dihydricphenol (DHP), namely 1,4-dihydroxybenzene or hydroquinone (HQ) which may have inert substituents, and Ph-terminated poly(phenylene oxide), is an oligomer of 2,6-dimethylphenol; or, PPO oligomers which are R$^s$-linked.

PPO is a particular example of a MHP in which the R$^s$ is the residue of the same MHP, or a similar oligomer in which the residue may be of another mononuclear MHP having some inert ring substituents.

I know of no instance where a PAPE oligomer has been provided with pendant vinyl or ethynyl groups on the electron-rich phenyl group in a repeating unit. Nor do I know of one where a sodium or potassium salt or other bisphenolate of a di-Ph terminated DH(T)P oligomer has been prepared which is substantially insoluble in commonly available organic solvents at room temperature, yet has been used in a modified Williamson etherification which provides the oligomer with benzyl or methylnaphthalene chain ends as a first step, and is subsequently polyfunctionalized in additional steps, so that pendant vinyl groups are provided in the backbone as just stated, and in addition, terminal vinyl groups are provided on electron rich residues of the chain ends. The process of my invention provides for such reactions with a large variety of PAPE oligomers including poly[DH(T)P] linked through a number of different R$^s$ linking groups, particularly those reactions providing pendant vinyl and ethynyl groups, irrespective of the type of the oligomers' chain ends which will affect the yields obtained.

Among these PAPE oligomers are (a) aromatic polyether and polythioether sulfones (all referred to as "APS" for brevity) in which the R$^s$ is a diphenyl sulfone (DPS) residue of a dihalophenyl sulfone (DHPS) linking group; (b) PPO oligomers, optionally linked with a diphenoquinone linking group, as disclosed in "Reactions of Poly(phenylene Oxide)s with Quinones. I. The Quinone-Coupling Reaction Between Low Molecular Weight Poly(2,6-Dimethyl-1,4-phenylene oxide) and 3,3',5,5'-tetramethyl-4,4'-Diphenoquinone", by Dwain M. White, *Jour. of Polym. Sci., Polym. Chem. Ed.*, Vol 19, 1367–1383 (1981); and (c) aromatic polyethers and thioethers in which the R$^s$ is not a sulfone. When the DHP is bisphenol A, and the R$^s$ is DPS, the repeating unit is bisphenol A sulfone ("BPAS"); when the DHTP is bisthiophenol A, the repeating unit is bisthiophenol A sulfone ("BTPAS"), both of which sulfones are together referred to herein as 'bis(thio)phenol A sulfones', and for brevity, "B(T)PAS". To obtain the polyfunctional PAPE oligomers with both terminal and pendant functional groups, salts of a wide spectrum of DH(T)P oligomers with terminals OH or SH groups are etherified to contain terminal methylaryl groups, and more preferably benzyl end groups, which benzyl-terminated oligomers are then polyfunctionalized.

Details of the analysis of the oligomers and a discussion of the results obtained will be found in an article titled "Functional Polymers and Sequential Copolymers by Phase Transfer Catalysis. 3. Synthesis and Characterization of Aromatic Polyether Sulfone and Poly(2,6-dimethyl-1,4-phenylene oxide) Containing Pendant Vinyl Groups" by Virgil Percec and Brian C. Auman, *Makromol. Chemie.*, and in another article titled "Aromatic Polyether Sulfones with Terminal or Pendant Styrene Groups: A New Class of Thermally Reactive Oligomers" by Virgil Percec and Brian C. Auman, *Polymer Preprints*, 25, No. 1, April 1984, and in references cited therein, relevant portions of which are incorporated thereto as if fully set forth herein.

SUMMARY OF THE INVENTION

It has been discovered that a [DH(T)P]$_n$ oligomer having pendant vinyl or ethynyl groups may be synthesized; a [DH(T)P]$_n$ oligomer having terminal vinyl or ethynyl groups in addition to the pendant groups may also be synthesized. Such oligomers (n=2 to about 100) consist essentially of at least one mononuclear or polynuclear DH(T)P monomer in which oligomer each phenyl ring is connected to another through an O, Si, C or S atom. In a specific instance, an aromatic polyether sulfone ("APS") is provided with both terminal and pendant vinyl groups which are attached to electron-rich phenyl groups in the backbone. If desired, the vinyl groups are then converted to terminal and pendant ethynyl groups.

It has also been discovered that a [MHP]$_n$, specifically poly(2,6-dimethyl-1,4-phenylene oxide) (PPO) can be provided with pendant vinyl groups; and, if desired, the pendant vinyl groups are then converted to ethynyl groups.

It is therefore a general object of this invention to provide a PAPE oligomer of a [DH(T)P$_n$ with pendant vinyl groups, and optionally, in addition, terminal vinyl groups; and, a PPO oligomer with pendant vinyl groups.

It has also been discovered that either a [DH(T)P]$_n$ or a PPO oligomer having pendant vinyl groups may be conveniently synthesized by a procedure in which the first step is chloromethylation to provide oligomers with chloromethyl pendant groups. For PPO, an alternative is to provide bromomethyl groups by radical bromination of some of the PPO's methyl groups. The chloromethylated or bromomethylated oligomers are then converted to their phosphonium salts and subjected to a phase transfer catalyzed ("PTC") Wittig reaction to provide oligomers with pendant vinyl groups.

It has still further been discovered that a [DH(T)P]$_n$ oligomer containing pendant ethynyl groups may be prepared by bromination of the oligomer containing pendant vinyl groups followed by "PTC" dehydrobromination.

Accordingly it is also a general object of this invention to provide [DH(T)P]$_n$ with pendant vinyl or ethynyl groups, and optionally, also terminal vinyl or ethynyl groups, all of which oligomers are thermally crosslinkable resulting in network polymers which are relatively flexible when the oligomer contains pendant vinyl groups; and network polymers which are relatively rigid when the oligomer contains pendant ethynyl groups.

DETAILED DESCRIPTION OF PREFERRED EMBODIMENTS

My invention is particularly directed, in its broad application, to the preparation of a polyfunctionalized substantially linear crosslinkable thermoplastic polyarylene polyether oligomer, or polyarylene polythioether oligomer (PAPE) having at least two pendant vinyl groups in said PAPE represented by a formula selected from:

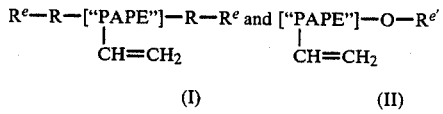

wherein,

R represents O or S in an ether linkage with R$^e$ or R$^{e'}$;

R$^e$ represents the residuum of a terminal dihydric phenol or dihydric thiophenol DH(T)P monomer having a terminal phenol, thiophenol or halophenyl group;

R$^{e'}$ represents the residuum of a terminal monohydric phenol MHP monomer having a terminal substituted phenol group;

"PAPE" represents the residuum of the PAPE oligomer which is selected from the group consisting of an oligomer of a monohydric 2,6-disubstituted phenol, and an oligomer of at least one mononuclear or polynuclear DH(T)P monomer in which oligomer each phenyl ring is connected to another through an O, Si, C or S atom; and, the vinyl group (—CH=CH$_2$) is connected to an electron-rich phenyl ring in the backbone of said PAPE.

In one preferred embodiment "PAPE" represents the residuum of the DH(T)P which may, if desired, be substituted with inert substituents on substitutable positions of the rings, so that the crosslinkable oligomer is represented by the formula:

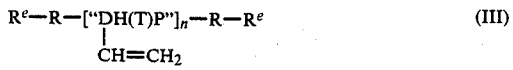

wherein, n is an integer in the range from 2 to about 100, and there is present from about 0.2 to about 2 vinyl groups per repeating unit in the oligomer's chain;

and, ["DH(T)P"] is the residuum of DH(T)P moieties linked through a linking residue R$^s$ so as to form a repeating unit

[DH(T)P-R$^s$]

wherein, R$^s$ represents the residuum of a reactive linking group selected from the group consisting of the same or another [DH(T)P]; a dihaloalkane having from 1 to about 18 carbon atoms, more preferably an α, ω-dihaloalkane such as dichloromethane; phosgene; alkyl diacid halides such as adipoyl chloride; aryl diacid halides such as terephthaloyl chloride; dihalophenyl phosphonates such as dichlorophenyl phosphine oxide (or dichlorophenyl phosphonate "DCPP"); dihaloaryl having six ring carbon atoms, such as dibromoxylene; bis(haloalkoxy) alkanes such as bis(chloromethoxy) butane ("BCMB"); and, dihalocycloalkanes having from 3 to 7 ring carbon atoms such as bis(chloromethyl)cyclohexane. More than one DH(T)P and more than one R$^s$ may be present in an oligomer.

Preferred [DH(T)P]$_n$ are oligomers formed from one or more dihydric phenols or thiophenols having a structure selected from

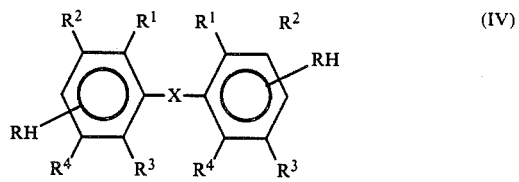

and

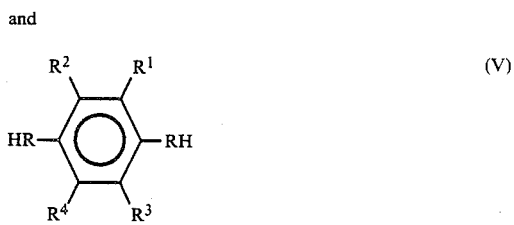

wherein, R represents O or S;

X represents a bond between aromatic carbon atoms or a divalent connecting radical selected from the group consisting of C=O, —O—, —S—, —S—S—, —SO$_2$—, —Si— and divalent organic hydrocarbon radicals such as alkylene, alkylidene, cycloaliphatic, or the halogen, alkyl, aryl, or like substituted alkylene, alkylidene and cycloaliphatic radicals as well as alkarylene, cycloalkyl and aromatic radicals, and a ring fused to both Ar groups; and, R$^1$, R$^2$, R$^3$, and R$^4$ referred to herein as inert substituents may, if present, each be the same or different and represent halogen, particularly chlorine or bromine; NO$_2$; alkyl having from 1 to about 18 carbon atoms, without regard for the spatial configuration such as normal, iso or tertiary; alkoxy having from 1 to about 18 carbon atoms; and, hydrogen.

As written in the structural formulae, it will be evident that a polynuclear phenol will have an RH on each phenyl ring, while mononuclear phenols have both RH on the ring, most preferably para- to each other, such substituents as may be present occupying one or more other positions on the ring.

When R$^s$ is a DH(T)P it is present in the backbone in an alternating configuration with the other DH(T)P. Reaction between the DH(T)P and the R$^s$ (also a DH(T)P) is effected with an electron withdrawing group as an activator to facilitate reaction between the two DH(T)Ps. For example when one is BPA and the other (the R⁵) is DCPS, the SO₂ group is the activator, and the terminal Cl atoms react with the H of the BPA to provide an oligomer with the alternating configuration. The identify of the activator group is not critical as long as it is inert in the reaction coupling the DHPs in the alternating configuration. Thus it will now be evident that when either of the DH(T)Ps is a diphenol linked with a weak activator group such as —O—, —S—, —S—S— or —Si—, then the other DH(T)P should be a diphenol linked with a strong activator group such as —CO— or —SO₂— to provide the alternating configuration. Most preferred are the strong activating groups such as the sulfone which bonds two halogen substituted benzenoid nuclei as in the 4,4'-dichlorodiphenyl sulfone and 4,4'-difluorodiphenyl sulfone, although such other strong withdrawing groups as hereinbefore mentioned may also be used with ease.

The alkyl substituents may be cyclic or acyclic, including alkyl-substituted cyclic, as long as the total carbon content conforms to the defined amount, and the same is true for alkoxy groups, provided all substituents are inert under reaction conditions. The inert substituents may be the same or different, though it will be apparent that some substituents will be easier than others for steric and other reasons.

Thus, it is seen that the particular structure of the dihydric phenol moiety is not narrowly critical. However, as would be expected, this moiety or residuum in the polymer chain can alter or vary the properties of the resultant polymer produced. Similarly, the reaction rate, optimum reaction temperature and like variables in the process can be varied by the selection of the particular dihydric phenol so as to give any desired change in rate, temperature, physical properties of the polymer and like changes.

It is also contemplated in this invention to use a mixture of two or more different dihydric phenols to accomplish the same ends as above. Thus when referred to above, the [DH(T)P] residuum in the polymer structure can actually be the same or different aromatic residue.

As herein used the DH(T)P term defined as being the "residuum of the dihydric (thio)phenol" of course refers to the residue of the dihydric phenol or thiophenol after the removal of the two H atoms from the two aromatic hydroxyl groups. Thus as is readily seen these polyarylene polyethers contain recurring groups of the residuum of the dihydric phenol and the residuum of the reactive linking group, if such is present, or the residuum of another DH(T)P, bonded through aromatic ether oxygen or thioether atoms.

It is preferred that two DH(T)P compounds be used, the first of which is a bisphenol type of compound, and the other a dihalobenzenoid compound which has the two halogens bonded to benzene rings having an electron withdrawing group in at least one of the positions ortho and para to the halogen group. The dihalobenzenoid compound can be either mononuclear where the halogens are attached to the same benzenoid ring, or polynuclear where they are attached in different benzenoid rings, as long as there is an activating electron withdrawing group in the ortho or para position of that benzenoid nucleus.

Any of the halogens may be the reactive halogen substituents on the benzenoid compounds. Fluorine and chlorine substituted benzenoid reactants are preferred; the fluorine compounds for fast reactivity and the chlorine compounds for their inexpensiveness.

More preferred are dihydric polynuclear phenols of the following four types including the derivatives thereof which are substituted with inert substituents:

(a) 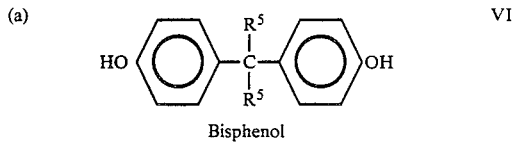

Bisphenol

VI (b) 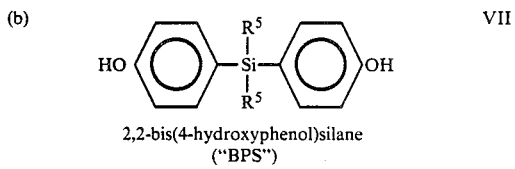

2,2-bis(4-hydroxyphenol)silane ("BPS")

VII in which R⁵ represents hydrogen, lower alkyl having from 1 to about 5 carbon atoms, phenyl and the halogen substituents thereof, and R⁵ may each be the same or different.

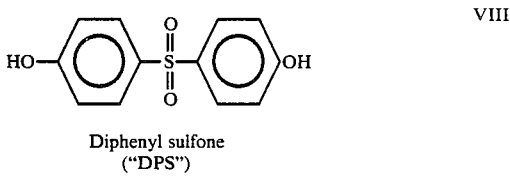

Diphenyl sulfone ("DPS")

VIII

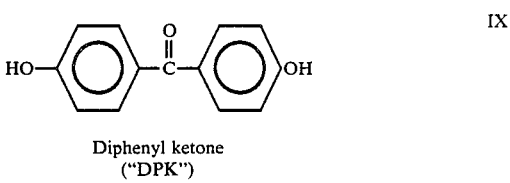

Diphenyl ketone ("DPK")

IX

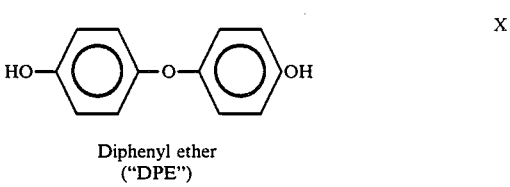

Diphenyl ether ("DPE")

X

Most preferred are PAPE oligomers in which R⁵ is a terminally halogenated DHP and the other DH(T)P is also a DHP, there being no additional R⁵ present. Such oligomers are exemplified by alternating configurations of VI and VIII; VI and IX; VI and X; VIII and X; VII and IX; and IX and X, which oligomers are then polyfunctionalized by the process of this invention to yield polyfunctionalized poly[dihydric phenols] ("di-[DHP]" for brevity).

Examples of the particular foregoing polynuclear phenols, and others referred to by the structure (IV) are given in U.S. Pat. No. 4,108,837 the disclosure of which is incorporated by reference thereto as if fully set forth herein.

In a PAPE oligomer formed from two DHP moieties (say BPA and DPS derived from a dihalophenyl sulfone DHPS such as dichlorodiphenyl sulfone DCPS), and no other R⁵ linking residue, the backbone consists essentially of an aromatic polyether sulfone (APS) having alternating bisphenol A "BPA(s)" and diphenyl sulfone "DPS(s)" residua, said APS being terminated with phenol or halophenyl units, optionally with each of said BPA(s), DPS(s) units having substituents, represented by formulae selected from:

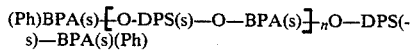

and,

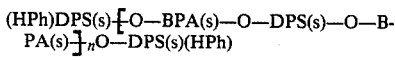

and the structures:

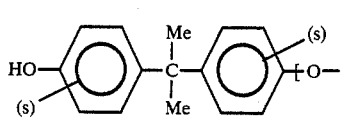

and,

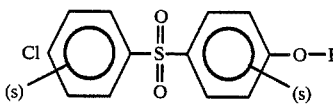

wherein, (s) on any substitutable ring carbon atom represents H or $R^1$, $R^2$, $R^3$ or $R^4$;

(Ph) and (HPh) represent the phenol and halophenyl portions of the terminal BPA(s) and DPS(s) units respectively; so that $R^e$ in formula (I) represents the terminal BPA unit having a terminal phenol group; or, the terminal DPS unit having a terminal halo(say, chloro)phenyl group.

Analogously, in a PAPE oligomer formed from a monohydric phenol MHP monomer such as 2,6-dimethylphenol DMP, the backbone consists essentially of poly(2,6-dimethyl-1,4-phenylene oxide) represented as follows:

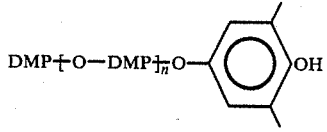

so that the residue $R^{e'}$ represents the residuum of the terminal DMP unit having a terminal

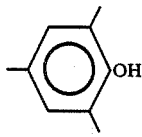

(substituted phenol group).

This new class of reactive oligomers undergoes fast curing, and APS oligomers in particular, having plural pendant groups in the backbone, yield thermally cured PAPE networks with glass transition temperatures $T_g$ values equal to or higher than those of conventional high mol wt PAPE materials.

The PAPE oligomer with pendant vinyl groups may, if desired, be modified to contain terminal vinyl groups as well. When this is done, as will be explained more fullly hereinafter, the PAPE oligomer is represented by a formula selected from:

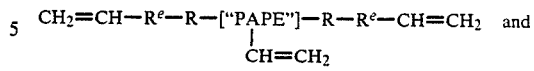

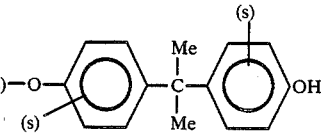

wherein, R, $R^e$, $R^{e'}$ and "PAPE" have the same connotation as that given hereinabove.

In the particular instance where "PAPE" represents the residuum of the DH(T)P the crosslinkable oligomer is represented by the formula:

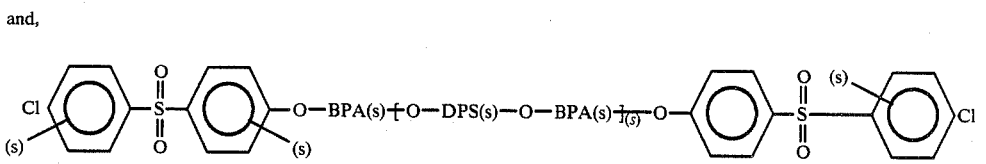

wherein, n is an integer in the range from 2 to about 100, and there is present from about 0.2 to about 2, more preferably about 1, pendent vinyl groups per repeating unit.

As has been pointed out, absent the terminal groups, at least two pendant functional (vinyl or ethynyl) groups are required in the backbone to provide crosslinking. Since an oligomer may conveniently have up to 100 repeating units, or more, particularly if the oligomer is PPO, it will be evident that there may be many more pendant groups on an oligomer than is required for desirable crosslinking. From a practical point of view, about 12 pendant groups are sufficient, there being no economic justification for many more.

If the oligomer has relatively few repeating units, there may be a pendant group on each electron-rich phenyl ring but there is no practical reason for introducing more than 2 vinyl groups per repeating unit. In most instances a single pendant group per repeating unit will be more than sufficient and from 0.2 to about 1 per repeating unit will give excellent results.

In the particular example of a specific APS, namely an oligomer or BPA and 4,4'-dichlorodiphenyl sulfone ("DCPS") which is $R^s$, or of BTPA and DCPS, the oligomer is formed by reaction of an alkali metal salt of the BPA, or BTPA preferably the potassium or sodium salt, and DCPS in anhydrous DMSO. The chain length of the APS oligomer formed is controlled by the relative ratio of BPA or BTPA and DCPS, a relatively lower $\overline{Mn}$ being obtained with a molar excess of BPA or BTPA; the larger the excess, the lower the $\overline{Mn}$.

As will immediately be realized, chain growth is propagated at active sites which are terminated with the alkali metal and the salt of the growing polymer remains soluble in the DMSO, though the solution may need to be warmed in the range from about 30° to about 100° C. The ratio of BPA and DCPS will also determine whether the oligomer's chain ends are the residues of a BPA unit with a terminal phenol group or, the residue of a DCPS unit with a terminal chlorophenyl group.

For illustrative purposes, an APS Oligomer formed from BPA and DCPS is used herein, optionally chain extended with a methylene residue derived from methylene chloride, thus giving chain extension through formal groups. The BPA-DCPS oligomer is prepared as described in "Functional Polymers and Sequential Copolymers by Phase Transfer Catalysis.1. Alternating Block Copolymers of Unsaturated Polyethers and Aromatic Poly(ether sulfone)s" by Virgil Percec and Brian C. Auman, *Makromol. Chem.* 185,617–627 (1984), and in my copending patent application Ser. No. 586,678 filed Mar. 6, 1984, the disclosures of each of which are incorporated by reference thereto as if fully set forth herein.

For illustrative purposes, commonly available PPO is used, except that it was purified by precipitation from chloroform solution into methanol.

If desired other DHP, that is other than DCPS may be used, but the dihalodiphenyl sulfones are preferred. They are represented by the structure:

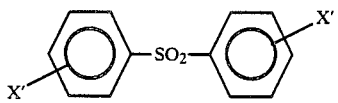

wherein the ring may have inert substituents (s) on a substitutable ring carbon atom, and X' is selected from fluorine, chlorine, bromine and iodine.

In an analogous manner ethers of oligomers with the following repeating units are provided with pendant vinyl groups, and additionally with terminal groups, if desired. It will be evident that, with terminal groups on an oligomer, only a single vinyl or ethynyl pendant group in an oligomer's chain will provide crosslinking, but as a matter of practice, plural pendant groups will be present in a chain.

[HQ—DPS]; where HQ represents hydroquinone
[BPA—DPS—HQ];
[BPA—CH$_2$—HQ];
[BPA—CH$_2$—Ph—CH$_2$—HQ] where Ph represents a phenyl ring;
[BPA—CH$_2$—Ph—CH$_2$—BPA]; and,
[PPO—HQ—PPO] wherein HQ is the linking residue.

Relatively high mol wt PAPE oligomers with pendant vinyl or ethynyl groups, optionally with at least one terminal functional group, which oligomers have a $\overline{Mn}$ in the range above 10,000 may be used for various forming operations, but the lower mol wt, in the range from about 1000 to about 10,000 are generally preferred. The functional groups may be crosslinked with a conventional free radical initiator, but they are easily thermally crosslinked, for example while being injection molded to form pump housings and the like. The crosslinked polymer is an engineering plastic which has excellent solvent resistance quite unlike commercially available PAPE polymers, for example Udel$^R$ APS which is available in the mol wt range of from about 20,000 to about 50,000, but my polymers have comparable physical strength. Lower $\overline{Mn}$ oligomers in the mol wt range from about 10,000 to about 20,000 may be crosslinked in solution with any monomer or macromer with a reactive vinyl or ethynyl group to form polymers which may also be used for various forming and molding applications. With a little trial and error such as one would normally expect to undertake to find the most desirable mol wt for a particular application, it will be found that the PPO oligomers will generally be higher, up to 100,000, and the oligomers of the dinuclear dihydric phenols will be lower than 10,000. Still another use for the polyfunctional PAPE oligomers is for blending with polymers to improve their processability, and to increase the $T_g$ of the finished product because of the generally high $T_g$ contributed by the oligomers after crosslinking.

The general procedures for preparing the polyfunctionalized oligomers are given herebelow. The $\overline{Mn}$ of particular APS oligomers used for illustrative purposes was measured quantitatively esterifying the phenolic end groups and the degree of polymerization was determined by $^1$H-NMR spectra from known relationships in the manner described in the aforementioned publications.

60 MHz $^1$H-NMR spectra were recorded on Varian A-60 and EM-360 instruments. 200 MHZ $^1$H-NMR spectra were recorded on a Varian XL-200 spectrometer. All spectra were obtained from CDCl$_3$ or CCl$_4$ solutions and with TMS as internal standard. A Digilab FTIR spectrometer was used to record IR spectra of polymer films on KBr plates or from KBr pellets. DSC curves and glass transition temperatures ($T_g$) were determined by a Perkin-Elmer Differential Scanning Calorimeter (Model DSC-2). Heating and cooling rates were 10° C./min. Indium was used as calibration standard. The $T_g$ values were recorded during the second heating cycle except as noted. GPC analyses were carried out with RI and UV detectors using $\mu$-Styragel columns of $10^5$, $10^4$, $10^3$ Å and a calibration plot constructed with polystyrene standards.

SYNTHESIS OF $\alpha$, $\omega$-DI(BENZYL)APS

The phenolic chain ends of $\alpha,\omega$-di(phenol)APS, prepared as described hereinabove, were etherified with benzyl chloride by a modified Williamson phase transfer catalyzed etherification as described by H. H. Freedman and R. A. Dubois in *Tetrahedron Letters*, 38, 3251 (1975). APS-3 was etherified in methylene chloride, and consequently, this reaction was accompanied by a slight degree of chain extension through aromatic formal groups. The etherification in methylene chloride is given as follows. To a stirred solution of 15 g (0.0088 moles —OH) $\alpha,\omega$-di(phenol)APS in 80 ml CH$_2$Cl$_2$, 4.3 ml (0.053 moles) 50% aqueous NaOH were added. The sodium salt of $\alpha,\omega$-di(phenol)APS precipitated immediately. After the addition of 3 g (0.0088 moles) TBAH the reaction mixture became homogeneous once more. To the stirred solution at room temperature, 1.8 ml (0.015 moles) benzyl chloride were added. After 10 hr of reaction at room temperature, the organic layer was separated and washed several times with dilute HFl, water, diluted to 150 ml with CH$_2$Cl$_2$, dried over Drierite, and precipitated into methanol. A second purification was performed by precipitating a methylene chloride solution of the polymer into methanol. $\alpha,\omega$-Di(benzyl)APS-2 was prepared under similar reaction conditions except that chlorobenzene was used as reaction solvent.

SYNTHESIS OF CHLOROMETHYLATED APS

To a solution of 15.4 g (0.035 moles structural units) α,ω-di(benzyl)APS-3 in 300 ml 1,1,2,2-tetrachloroethane (TCE), were added successively 45.54 g (0.29 moles) 1-chloromethoxy-4-chlorobutane (CMCB) and 2.09 ml (0.0179 moles) $SnCl_4$. After two hours of stirring at 110° C., the reaction mixture was cooled, deactivated with 10 ml methanol, and precipitated into methanol. Two more precipitations were carried out by dissolving the polymer in chloroform, filtering the solution, and precipitating with methanol. The chloromethyl content was determined by $^1$H-NMR, giving 1.2 —$CH_2Cl$ groups per polymeric structural unit.

APS-2 from Table 1 was prepared under similar reaction conditions by using 2.0 g ($4.55 \times 10^{-3}$ moles structural units) APS-2, 40 ml TCE, 5.9 g ($3.76 \times 10^{-2}$ moles) CMCB, and 0.15 ml ($1.28 \times 10^{-3}$ moles) $SnCl_4$. The resulting polymer contained 0.57 —$CH_2Cl$ groups per polymeric structural unit.

SYNTHESIS OF THE PHOSPHONIUM SALT OF CHLOROMETHYLATED APS

To a solution of 8 g (0.016 moles structural units, 0.0192 moles of —$CH_2Cl$ groups) chloromethylated APS-3 in 60 ml dioxane, 12 g (0.046 moles) $PPh_3$ were added. After 15 minutes of reflux under strong stirring, a yellow viscous liquid started to separate. The reaction was continued at reflux temperature for a total of 15 hours. After cooling to room temperature, the polymer solidified and the mixture was precipitated with ethyl ether. The yellow product was filtered, washed several times with ethyl ether, and dried under vacuum at room temperature. The same procedure was used for the preparation of the phosphonium salt of chloromethylated APS-2.

SYNTHESIS OF APS WITH PENDANT VINYL GROUPS (a) Wittig Reaction in Methanol-Water To a solution of 10 g (0.012 moles structural units, 0.014 moles phosponium groups) of the phosphonium salt of chloromethylated APS-3 in 200 ml methanol. 2 ml Triton-B (40% aqueous solution) and 11.5 ml (0.14 moles) formaldehyde (37% aqueous solution) were added. The stirred reaction mixture was treated slowly with 36 ml (0.42 soles) of 50% aqueous NaOH. A precipitate started to appear after the addition of the first drops of the NaOH solution. After 10 hr of reaction at room temperature, the precipitate was filtered and dried under vacuum at room temperature. The separate polymer was dissolved in $CH_2Cl_2$, washed several times with water, and precipitated with methanol.

(b) Wittig Reaction in Methylene Chloride-Water

To a solution of 1.9 g (0.0031 moles structural units, 0.0018 moles phosphonium groups) of the phosphonium salt of chloromethylated APS-2 in 40 ml methylene chloride at ice water temperature, 1.6 ml (0.0195 moles) formaldehyde (37% aqueous solution) and 0.4 ml of Triton-B (40% aqueous solution) were added. The stirred reaction mixture was treated slowly with 5 ml (0.0625 moles) of 50% aqueous NaOH. After all the hydroxide solution was added, the reaction mixture was allowed to react at room temperature. After 3 hours of reaction, a sample was removed from the organic phase and precipitated into methanol. $^1$H-NMR analysis of the polymer showed complete reaction at this point. After 7 hours of reaction, the organic layer was separated, washed with dilute HCl, then several times with water, and then precipitated into methanol. A second purification was carried out by filtering a chloroform solution of the polymer, followed by precipitation of this solution into methanol.

SYNTHESIS OF APS-3 WITH PENDANT DIBROMOVINYL GROUPS

A solution of 6 g (0.01 moles structural units, 0.0125 moles vinyl groups) APS-3 with pendant vinyl groups in 30 ml methylene chloride was cooled in an ice water bath and titrated with bromine until an orange color peristed. After 30 minutes of stirring at room temperature, the polymer was precipitated with methanol, filtered, and dried under vacuum.

SYNTHESIS OF APS-3 WITH PENDANT ETHYNYL GROUPS (a) Dehydbromination with K-t-Bu To a stirred solution at room temperature of 2 g (0.0025 moles structural units, 0.003 moles dibromovinyl units) dibromovinyl APS-3 in 20 ml DMSO. 1.4 g (0.012 moles) K-t-Bu in 5 ml DMSO were added dropwise. A yellow brown polymer started to precipitate even during the addition of the K-t-Bu solution. The reaction mixture was stirred at room temperature for 1 hour and then precipitated into methanol, filtered, and dried under vacuume at room temperature. After 3 hr of reaction, a sample was removed from the organic phase and precipitated into methanol. $^1$H-NMR analysis of the polymer showed complete reaction at this point. After 7 hr of reaction, the organic layer was separated, washed with dil HCl, then several times with water, and then precipitated into methanol. A second purification was carried out by filtering a chloroform solution solution of the polymer, followed by precipitation of this solution into methanol.

(b) Dehydrobromination with NaOH in the presence of TBAH

To a vigorously stirred mixture of 2.0 g (0.0025 moles structural units, 0.003 moles dibromovinyl groups) dibromovinyl APS-3 solution in 30 ml $CH_2Cl_2$ and 10 ml 50% aqueous NaOH at room temperature. 3.0 g (0.009 moles) TBAH were added. An exothermic reaction took place. After 1.5 hrs. of stirring at room temperature, the organic portion was washed with water, dilute HCl, again with water, and then precipitated into methanol. A white soluble polymer was obtained.

SYNTHESIS OF CHLOROMETHYLATED PPO

A solution of 2.5 g (0.021 moles structural units) PPO in 50 ml chloroform was added dropwise to a stirred solution of 16.56 g (0.105 moles) CMCB and 1 ml (0.00855 moles) $SnCl_4$ in 100 ml chloroform at ice water temperature. After the PPO solution addition was complete (approx. 30 min), the reaction mixture was stirred at room temperature for 1 hr. The catalyst was deactivated with a few ml methanol, and then the solution was precipitated into methanol. Two more purifications were carried out by dissolving the product in chloroform, filtering the solution, and precipitating the polymer with methanol. The product was then air dried at room temperature. The chloromethyl content determined by $^1$H-NMR spectroscopy was 0.53 bromomethyl groups per PPO structural unit.

SYNTHESIS OF THE PHOSPHONIUM SALTS OF CHLOROMETHYLATED AND BROMOMETHYLATED PPO

The phosphonium salts of chloromethylated and bromomethylated PPO were prepared in a similar manner as the phosphonium salt of chloromethylated APS. The only difference is that toluene was used as solvent for the reaction.

SYNTHESIS OF PPO WITH PENDANT VINYL GROUPS (a) Wittig Reaction in Methanol-Water A similar procedure as that presented for the preparation of PSU with pendant vinyl groups was used. After an hour of reaction at room temperature, the $^1$H-NMR analysis of the precipitated polymer demonstrated complete reaction.

(b) Wittig Reaction in Methylene Chloride-Water

The synthetic method is similar to that presented for the preparation of APS with pendant vinyl groups. The phosphonium salt is only partially soluble in methylene chloride but the polymer became soluble once its phosphonium groups were transformed into vinyl groups. $^1$H-NMR analysis of the organic phase showed that the reaction was over after 30 minutes.

The thermal behavior of all these thermally reactive oligomers is summarized in Table I. In this table, the initial $T_g$ of the reactive oligomers is labelled as $T_g^i$. While the temperature at which the exothermal process starts is designated $T_s$. The final $T_g$ obtained is given as $T_g^f$.

The DSC traces of α,ω-di(phenol) APS-3 and APS-3 with 1.2 vinyl or 1.0 ethynyl groups per bisphenol-A unit shows that the starting material has a $T_g=148°$ C. The first heating run of α,ω-di(benzyl)APS-3 with pendant vinyl groups provides a $T_g=164°$ C. and an exothermal process with a maximum at 265° C. The second heating run of this sample is void of the exothermal peak and the cured APS-3 presents a $T_g=282°$ C. This represents a 118° C. increase in the glass transition temperature for this sample, and at the same time, represents a 100° C. higher $T_g$ than that of conventional high molecular weight APS ($T_g=180°$ C. for $\overline{Mn}=20,000$).

According to the GPC curve for α,ω-di(benzyl) APS-3, it already has a branched structure and even its first heating run did not show any $T_g$. The onset of the exothermal process for this sample increased from the first to second to third heating scan from 220° C. to 280° C. to 305° C., which demonstrates that the thermal curing process is very fast for vinyl type groups relative to acetylene type groups.

The DSC curves of α,ω-di(phenol)APS-2, α,ω-di(benzyl)APS-2 and α,ω-di(benzyl)APS-2 containing 0.57 vinyl groups per bisphenol-A unit, obtained by the benzylation of α,ω-di(phenol)APS in chlorobenzene shows no increase in molecular weight due to chain extension. The $T_g$ values of α,ω-di(phenol)APS are higher than those of the corresponding benzylated polymer. This is the reason for the decrease in the APS's $T_g$ value from 138° C. to 117° C. after benzylation. The further modification of the APS backbone through the introduction of pendant double bonds, and/or the crosslinking which results from the chloromethylation reaction increases the $T_g$ back to the region of the starting α,ω-di(phenol)APS. It is interesting to observe that although the concentration of double bonds in half that of the previous sample (APS-3), the increase in $T_g$ after the first heating scan is the same, i.e., 118° C.

DSC curves were obtained of the starting PPO's (PPO-1 and PPO-2) containing 0.35 vinyl groups per structural unit and the PPO containing 0.09 vinyl groups per structural unit. Both these functional polymers were prepared from chloromethylated PPO. The increases in $T_g$ values after thermal curing are 44° C. and 29° C., respectively. It is interesting to note that after thermal curing, the PPO containing pendant vinyl groups derived from 0.6 chloromethyl groups per repeat unit does not show a $T_g$ value below 325° C. The same is true for the PPO with pendant vinyl groups obtained from bromomethylated PPO (0.53 groups per repeat unit). The major difference between PPO with pendant vinyl groups obtained from bromomethylation and that obtained from chloromethylation is that, in the former case, the $T_g$ of the uncured polymer is always lower than the starting material. In the latter case, the $T_g$ of the uncured polymer is always higher than that of the starting material.

In the foregoing illustrative examples, the terminal vinyl groups were provided in addition to the pendant groups. To do so, the OH-terminated APS oligomer is first benzylated to yield the dibenzyl-APS (designated APS-2Bz in Table I). It will be evident that if the APS was terminated with DPS chain ends (halophenyl terminal groups), no terminal functional groups would be present in the difunctionalized oligomer, only the pendant groups.

Since the goal is to provide a reactive oligomer which will allow thermal crosslinking, it will be evident that the oligomer requires plural pendant and/or terminal functional groups, in any combination, sufficient to provide the crosslinking. For very low mol wt oligomers, it may be feasible to provide terminal functional groups and only one pendant group in the backbone, but from a practical point of view, the preferred oligomers with terminal functional groups will also have at least two (2) pendant groups in the backbone, whether they be vinyl or ethynyl groups.

In Scheme-1 there is set forth the sequence of steps for the synthesis of APS containing both terminal and pendant vinyl and ethynyl groups. The conversion of the vinyl groups to ethynyl groups may be extended to any PAPE oligomer so as to form an oligomer having at least two pendant ethynyl groups, represented by a formula selected from:

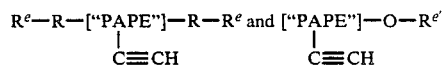

wherein, R represents O or S in an ether linkage with $R^e$ or $R^{e'}$; $R^e$ represents the residuum of a terminal dihydric phenol or dihydric thiophenol DH(T)P monomer having a terminal phenol, thiophenol or halophenyl group; $R^{3'}$ represents the residuum of a terminal monohydric phenol MHP monomer having a terminal substituted phenol group;

"PAPE" represents the residuum of the PAPE oligomer which is selected from the group consisting of an oligomer of a mononuclear or polynuclear DH(T)P monomer in which oligomer each phenyl ring is connected to another through an O, Si, C or S atom; and, the ethynyl group (—C≡CH) is connected to an electron-rich phenyl ring in the backbone of the PAPE.

As it is the vinyl groups which are converted to ethynyl groups, the ∫PAPE" represents the residuum of the DH(T)P, which as before, may be substituted with inert substituents, so that the crosslinkable oligomer is represented by the formula:

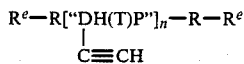

wherein, n is an integer in the range from 2 to about 100, and there is present from about 0.2 to about 1 ethynyl group per repeating unit in the oligomer's chain; ["DH(T)P"] is the residuum of DH(T)P moieties linked through a linking residue $R^s$ so as to form a repeating unit

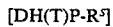

wherein DH(T)P is a residuum of a structure selected from the structures (I) and (II); so that the molecular weight $\overline{Mn}$ of the crosslinkable oligomer is in the range from about 1000 to about 100,000.

If [DH(T)P] is chain extended with the residuum $R^s$ of a reactive linking group the oligomer is represented by the formula:

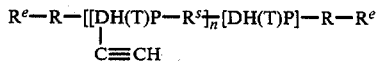

wherein, $R^s$ has the same connotation as that given hereinbefore, preferably a residuum of a dihydric phenol ("DHP") selected from the group consisting of a dihydric polynuclear phenol, for example BPA, and a dihydric mononuclear phenol, for example HQ (hydroquinone, 1,4-dihydroxy benzene).

Any combination of suitable DHPs may be present as residua in the repeating units, the ones given hereinbefore being preferred, and the combination of BPA and DPS being the most preferred.

Of course, if terminal ethynyl groups are desired, in addition to the pendant ones, the starting vinyl-functional oligomer must contain terminal vinyl groups in addition to pendant ones. The PAPE oligomer obtained will then have at least one terminal ethynyl group in addition to the pendant ethynyl groups, and is represented by a formula selected from:

and

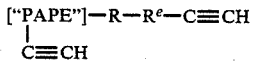

When "PAPE" represents the residuum of the DH(T)P (substituted, if desired), the oligomer is represented by the formula:

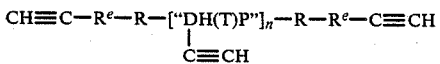

wherein, n is an integer in the range from 2 to about 100, and there is present from 0.2 to about 1 ethynyl group per repeating unit; ["DH(T)P"] is the residuum of DH(T)P moieties linked through a linking residue $R^s$ so as to form a repeating unit

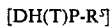

wherein DH(T)P is a residuum of a structure selected from the structures (I) and (II); so that the molecular weight $\overline{Mn}$ of the crosslinkable oligomer is in the range from about 1000 to about 10,000.

In the specific instance when the backbone is PPO terminated with a 2,6-dimethylphenol (DMP) unit, only pendant ethynyl groups need be provided, particularly as the preferred PPO oligomers have a mol wt in the range from about 10,000 to about 100,000.

In Scheme-2 there is set forth two different routes for the synthesis of PPO containing pendant vinyl groups, which may then be converted to ethynyl groups in a manner analogous to that shown in Scheme-1. Though $SnCl_4$ is used as a catalyst for chloromethylation of the PPO, other Lewis acids may be used, though with varying degrees of effectiveness. Also, though Triton B is an effective phase transfer catalyst, any other suitable phase transfer catalyst may be used.

The main steps in the foregoing process for forming a PAPE oligomer with at least two pendant vinyl groups in its backbone may be set forth as follows:

(a) reacting a PAPE oligomer having a molecular weight $\overline{Mn}$ in the range from about 1000 to about 100,000, with a halomethylating agent in a first solvent for said PAPE oligomer and said halomethyalting agent, in the presence of a Lewis acid catalyst so as to introduce at least two pendant halomethyl groups on electron-rich phenyl groups in the oligomer and yield a halomethylated PAPE oligomer;

(b) reacting the halomethylated PAPE oligomer with triphenyl phosphine in solution with a second solvent, the same as or different from the first solvent, so as to yield the phosphonium salt of the halomethylated PAPE oligomer;

(c) reacting the phosphonium salt with a lower aliphatic aldehyde in the presence of aqueous alkali and an organic phase solvent for the phosphonium salt so as to yield at least two pendant vinyl groups on the backbone of the PAPE oligomer;

(d) precipitating the polyfunctionalized PAPE oligomer from the organic phase; and, (e) recovering the polyfunctionalized PAPE oligomer.

If in addition to the pendant vinyl groups, it is desired to provide the PAPE oligomer with terminal groups, then the starting material has phenol end groups which are benzylated by reaction with benzyl chloride or other α-haloaralkyl compound in an organic solvent, for example a halocarbon, in the presence of concentrated aqueous alkali metal hydroxide solution and a phase transfer catalyst, at a temperature below the reflux temperature of the solvent. A work-up of the reaction mixture produces the PAPE with benzyl chain ends which may then be chloromethylated thus providing chloromethyl groups on the chain ends in addition to chloromethyl pendant groups in the backbone. Preferred oligomers for terminal and pendant vinyl groups are APS oligomers.

The process for converting the PAPE oligomer with vinyl functionality to one with ethynyl functionality includes the following main steps:

(a) reacting the vinyl functional groups with sufficient bromine to convert them to dibromovinyl groups, and, (b) dehydrobrominating the pendant dibromovinyl groups, either by reaction with K-t-Bu in an aggressive solvent such as DMSO, extracting with a halocarbon and precipitating the oligomer; or, by heating with conc aqueous NaOH solution in a halocarbon solvent in the presence of a phase transfer catalyst, and working up the organic phase to precipitate the oligomer.

For convenient reference, the following is a list of the acronyms used in the foregoing specification:

APS: α,ω-di(phenol)aromatic poly(thio)ether sulfone
CMCB: 1-chloromethoxy-4-chlorobutane
BPA: bisphenol A
BTPA: bisthiophenol A
B(T)PA: BPA and/or BTPA
BPAS: BPA sulfone
BTPAS: bisthiophenol A sulfone
B(T)PAS: bisphenol A sulfone and/or bisthiophenol A sulfone
BPA(s): BPA with inert substituents
BTPA(s) bisthiophenol A with inert substituents
B(T)PA(s): BPA(s) or BTPA(s)
DCPS: dichlorophenyl sulfone
DHP: dihydric phenol
DHPS: dihalophenyl sulfone
DHTP: dihydric thiophenol
DH(T)P: dihydric phenol and/or dihydric thiophenol
DMF: dimethyl formamide
DMSO: dimethyl sulfoxide
DPE: diphenyl ether
DPK: diphenyl ketone
DPS: diphenyl sulfone
HPh: halophenyl
HQ- hydroquinone
MHP: monohydric phenol
K-t-Bu: potassium-tert-butoxide
PAPE: polyarylene polyether
Ph: phenol
PP: polyphenylene
PPO: poly(phenylene oxide)
PTC: phase transfer catalyst, phase transfer catalytic
TBAH: tetrabutylammonium hydrogen sulfate
TCE: trichloroethane
TPh: thiophenol
$T_g$: glass transition temperature

TABLE I
THERMAL CHARACTERIZATION BY DSC OF APS AND PPO WITH PENDANT VINYL AND ETHYNYL GROUPS

| | and PPO Starting Materials | | | | | Functionalized and PPO | | | | | | | |
|---|---|---|---|---|---|---|---|---|---|---|---|---|---|
| Sample | $\overline{Mn}$ | $\overline{Mw}$ (GPC) | $\overline{Mw}/\overline{Mn}$ | $\overline{Mn}$ (NMR) | Tg (°C.) | Type[a] | Degree of Functionalization[b] | $T_g^i$ (°C.) | Ts (°C.) | Ts-$T_g^i$ (°C.) | $T_g^f$ (°C.) | $T_g^{f-T_g^i}$ (°C.) | Reaction Time to $T_g^f$ at 327° C.) |
| APS-3 | 3270 | 5570 | 1.7 | 3410 | 148 | VC | 1.20 | 164 | 202 | 38 | 282[c] | 118 | — |
| | | | | | | E | (1.20) | — | 207 | — | None[d] | — | — |
| APS-2 | 2820 | 4410 | 1.6 | 3050 | 138 | VC | 0.57 | 139 | 158 | 19 | 262 | 123 | 0.1 hr. |
| APS-2Bz | — | — | — | 3230 | 117 | | | | | | | | |
| PPO-1 | 21,000 | 53,000 | 2.5 | — | 217 | VC | 0.35 | 228 | 275 | 47 | 272[e] | 44 | — |
| PPO-2 | 19,000 | 49,000 | 2.6 | — | 209 | VC | 0.09 | 215 | 273 | 58 | 244 | 29 | 0.2 hr. |
| | | | | | | VC | 0.60 | 241 | 263 | 22 | None[d] | — | — |
| | | | | | | VB | 0.53 | 185 | 225 | 40 | None[d] | — | — |

[a]VC = vinyl from chloromethylation, VB = vinyl from bromination, E = ethynyl from VC.
[b]Mole fraction of chloromethyl or bromoethyl groups per repeat unit.
[c]After only one heating to 327° C. and subsequent quenching at 320°/min.
[d]No Tg within range tested (27 to 327° C.).
[e]Tg after four heats to 327° C., but not held at 327° C.

SCHEME-1:
Synthetic Routes Used for the Synthesis of Aromatic Polyether Sulfones Containing Vinyl and Ethynyl Pendant Groups

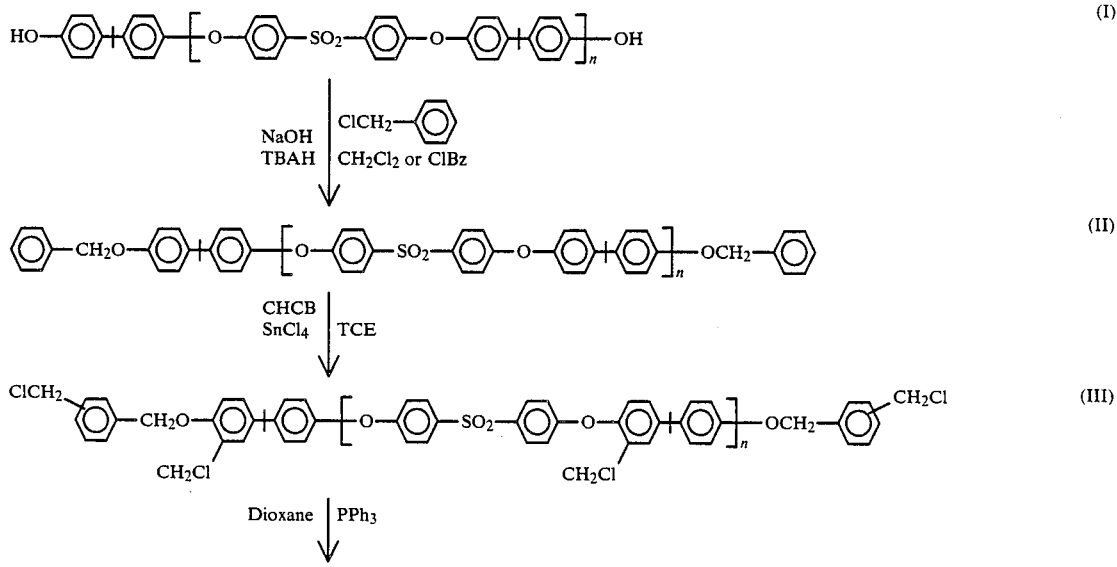

-continued
SCHEME-1:
Synthetic Routes Used for the Synthesis of Aromatic Polyether Sulfones Containing Vinyl and Ethynyl Pendant Groups
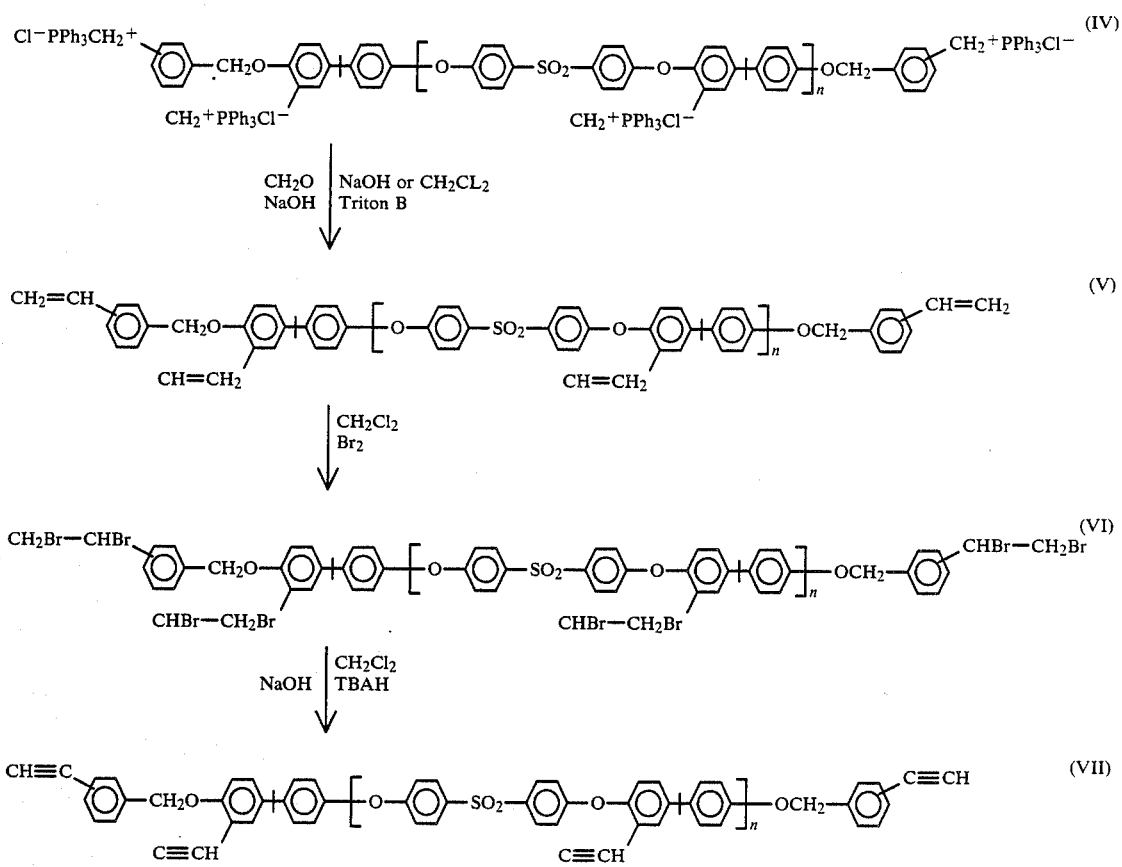
SCHEME 2:
Synthetic Routes Used for the Synthesis of PPO Containing Pendant Vinyl Groups
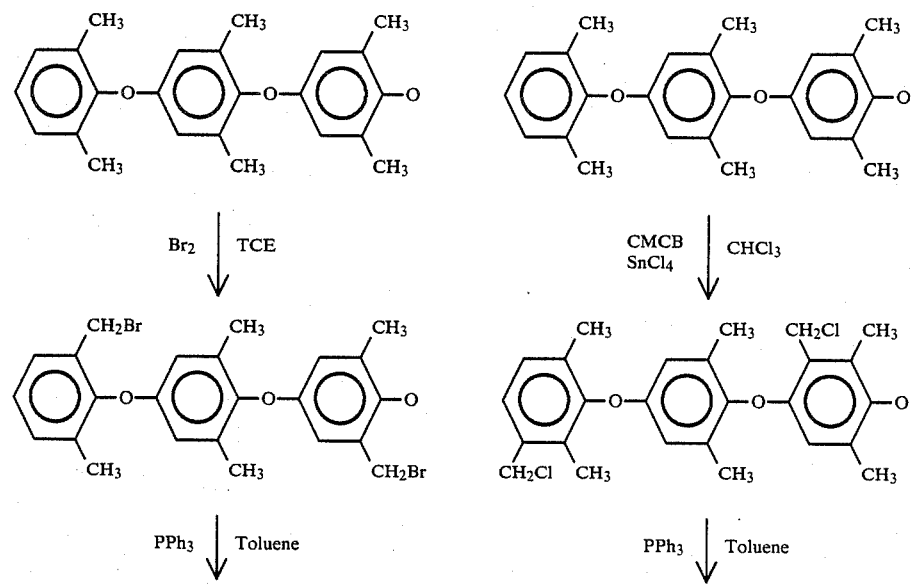

-continued
SCHEME 2:
Synthetic Routes Used for the Synthesis of PPO Containing Pendant Vinyl Groups

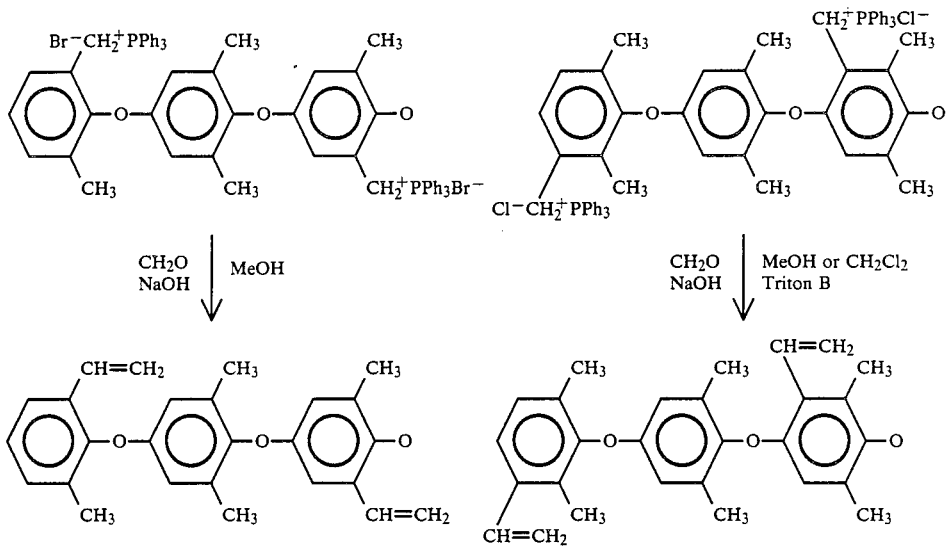

I claim:

1. A polyfunctionalized substantially linear crosslinkable thermoplastic polyarylene polyether oligomer, or polyarylene polythioether (PAPE) oligomer having at least two pendant vinyl groups in said oligomer represented by a formula selected from:

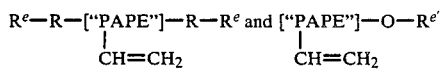

wherein,
R represents O or S in an ether linkage with $R^e$ or $R^{e'}$;
$R^e$ represents the residuum of a terminal dihydric phenol or dihydric thiophenol DH(T)P monomer having a terminal phenol, thiophenol or halophenyl group;
$R^{e'}$ represents the residuum of a terminal monohydric phenol MHP monomer having a terminal substituted phenol group;
"PAPE" represents the residuum of the PAPE oligomer which is selected from the group consisting of an oligomer of a monohydric 2,6-disubstituted phenol, and an oligomer of at least one mononuclear or polynuclear DH(T)P monomer in which oligomer each phenyl ring is connected to another through an O, Si, C or S atom; and,
the vinyl group (—CH=CH₂) is connected to an electron-rich phenyl ring in the backbone of said PAPE.

2. The crosslinkable PAPE oligomer of claim 1 wherein said "PAPE" represents the residuum of said DH(T)P optionally substituted with inert substituents, so that said crosslinkable oligomer is represented by the formula:

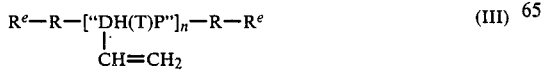

wherein, n is an integer in the range from 2 to about 100, and there is present from about 0.2 to about 2 vinyl groups per repeating unit in the oligomer's chain;
R and R³ have the same connotation as hereinbefore; and,
["DH(T)P"] is the residuum of DH(T)P moieties linked through a linking residue $R^s$ so as to form a repeating unit

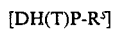

wherein DH(T)P is a residuum of a structure selected from

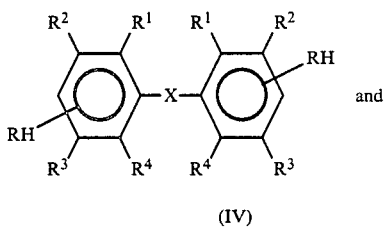

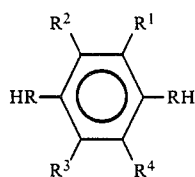

X represents a bond between aromatic carbon atoms or a divalent connecting radical selected from the group consisting of C=O, —O—, —S—, —S—S—, —SO₂—, —Si— and divalent organic hydrocarbon radicals such as alkylene, alkylidene, cycloaliphatic, or the halogen, alkyl, aryl, or like substituted alkylene, alkylidene and cycloaliphatic radicals as well as alkarylene, cycloalkyl and aromatic radicals, and a ring fused to both Ar groups;

$R^1$, $R^2$, $R^3$, and $R^4$ are inert substituents, which if present on any phenyl ring, may each be the same or different and represent halogen, particularly chlorine or bromine; $NO_2$; alkyl having from 1 to about 18 carbon atoms, without regard for the spatial configuration such as normal, iso or tertiary; alkoxy having from 1 to about 18 carbon atoms; and, hydrogen; and, $R^s$ represents the residuum of a reactive linking group selected from the group consisting of the same or another [DH(T)P]; a $\alpha,\omega$-dihaloalkane having from 1 to about 18 carbon atoms; phosgene; alkyl and aryl diacid halides including dihaloaryl having six ring carbon atoms; dihalophenyl phosphonate; bis(-haloalkoxy) alkane having from 3 to about 20 carbon atoms; and, dihalocycloalkanes having from 3 to 7 ring carbon atoms; so that the molecular weight $\overline{Mn}$ of said crosslinkable oligomer is in the range from about 1000 to about 100,000.

3. The PAPE oligomer of claim 1 wherein R represents O.

4. The PAPE oligomer of claim 1 wherein R represents S.

5. The PAPE oligomer of claim 1 wherein said $R^{e'}$ represents the residuum of 2,6-dimethylphenol.

6. The PAPE oligomer of claim 1 wherein said R represents O, and said $R^e$ represents the residuum of a dihydric phenol having a chain end selected from a phenol group and a halophenyl group.

7. The PAPE oligomer of claim 2 wherein said [DH(T)P] is chain extended with the residuum $R^s$ of said reactive linking group so that said crosslinkable oligomer is represented by the formula:

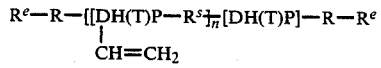

wherein, $R^s$ represents the residuum of a reactant, or, reactive solvent, which residuum links two [DH(T)P] moieties which may be the same or different.

8. The PAPE oligomer of claim 2 wherein DH(T)P and $R^s$ are each residua of a dihydric phenol ("DHP") selected from the group consisting of a dihydric polynuclear phenol and a dihydric mononuclear phenol.

9. The PAPE oligomer of claim 8 wherein said polynuclear DHP is selected from the group consisting of 2,2-bis(4-hydroxyphenyl)propane; 2,2-bis(4-hydroxyphenyl)silane; diphenyl sulfone; diphenyl sulfide; diphenyl ketone and diphenyl ether; and said mononuclear DHP is a 1,4-dihydroxy benzene.

10. The PAPE oligomer of claim 9 wherein the combinations of the following DHPs are present as residua in the repeating unit:

(i) 2,2-bis(4-hydroxyphenyl)propane and diphenyl sulfone;

(ii) 2,2-bis(4-hydroxyphenyl)propane and diphenyl ketone;

(iii) 2,2-bis(4-hydroxyphenyl)propane and diphenyl ether;

(iv) diphenyl sulfone and diphenyl ketone;

(v) diphenyl ketone and diphenyl ether;

(vi) diphenyl sulfone and diphenyl ether;

(vii) diphenyl sulfone and 1,4-dihydroxy benzene;

(viii) diphenyl sulfide and diphenyl sulfone;

(ix) 2,2-bis(4-hydroxyphenyl)propane, diphenyl sulfone and 1,4-dihydroxy benzene; and, (x) diphenyl sulfone and 1,4-dihydroxy benzene.

11. The PAPE oligomer of claim 5 wherein said "PAPE" is the residuum of an oligomer of 2,6-dimethylphenol having a mol wt in the range from 1000 to about 10,000 and the O ether atom of one phenyl ring is connected to the phenyl ring of the next succeeding ring in said "PAPE".

12. The PAPE oligomer of claim 7 wherein $R^s$ is a residuum selected from the group consisting of alkenyl having from 1 to about 20 carbon atoms, dihalophenyl phosphonate, and aralkenyl having from 7 to about 27 carbon atoms.

13. The PAPE oligomer of claim 7 wherein one said dihydric phenol moiety is derived from 4,4'-isopropylidenediphenol (BPA), and another dihydric phenol moiety is derived from a dihalophenylsulfone (DHPS) having the structure:

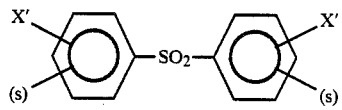

wherein,

X' represents halogen selected from the group consisting of fluorine, chlorine, bromine and iodine on one ring carbon atom; and, (s) represents inert substituents $R^1$-$R^4$ any of which if present on remaining positions on each ring, may each be the same or different and represent alkyl having from 1 to about 18 carbon atoms, without regard for the spatial configuration such as normal, iso or tertiary; alkoxy having from 1 to about 18 carbon atoms; nitro ($NO_2$) and, hydrogen.

14. The PAPE oligomer of claim 13 wherein the backbone consists essentially of an aromatic polyether sulfone (APS) having alternating bisphenol A "BPA(s)" and diphenyl sulfone "DPS(s)" residua, said APS being terminated with phenol or halophenyl units, optionally with each of said BPA(s), DPS(s) units having substituents, represented by formulae selected from:

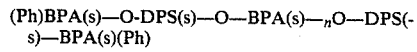

and,

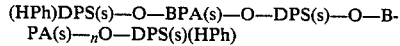

and the structures:

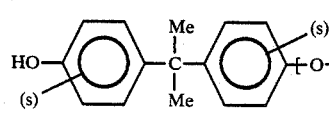 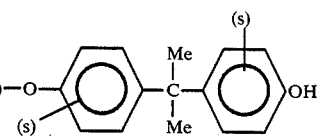

and

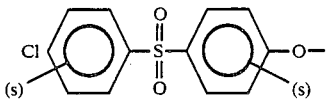 —O—BPA(s)—[—O—DPS(s)—O—BPA(s)—]—O— 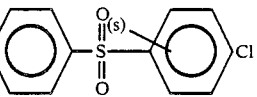

wherein, (s) on any substitutable ring carbon atom represents H or $R^1$, $R^2$, $R^3$ or $R^4$;

(Ph) and (HPh) represent the phenol

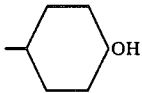

and halophenyl

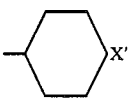

portions of the terminal BPA(s) and DPS(s) unit respectively;

$R^1$, $R^2$, $R^3$ and $R^4$ are inert substituents, any of which, if present on any phenyl ring, and $R^5$, may each be the same or different, and are selected from the group consisting of halogen, alkyl having from 1 to about 18 carbon atoms, and alkoxy having from 1 to about 18 carbon atoms, said alkyl and alkoxy being each chosen without regard for the spatial configuration of the carbon atoms; and, n represents an integer in the range from about 2 to about 10.

15. The PAPE oligomer of claim 12 wherein one said dihydric phenol moiety is derived from 4,4'-isopropylidenediphenol (BPA), and another dihydric phenol moiety is derived from a dihalophenylsulfone (DHPS).

16. The PAPE oligomer of claim 1 wherein the backbone consists essentially of poly(2,6-dimethyl-1,4-phenylene oxide) terminated with a 2,6-dimethylphenol DMP unit, said backbone being represented by the structure:

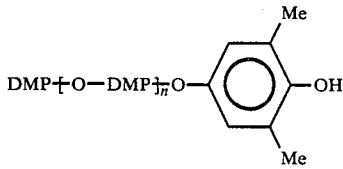

wherein, n represents an integer from about 5 to about 100, and there are from 2 to about 12 pendant vinyl group present in said backbone, and DMP represents dimethyl substituted phenol.

17. The PAPE oligomer of claim 1 having at least one terminal vinyl group in addition to said pendant vinyl groups, said oligomer being represented by a formula selected from:

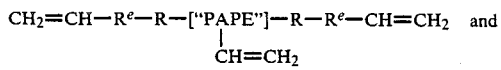 and

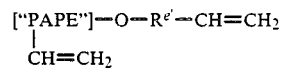

wherein,

R, $R^e$, $R^{e'}$ and "PAPE" have the same connotation as in claim 1.

18. The crosslinkable PAPE oligomer of claim 2 wherein said "PAPE" represents the residuum of said DH(T)P optionally substituted with inert substituents, so that said crosslinkable oligomer is represented by the formula:

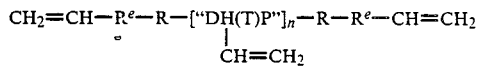

wherein, n is an integer in the range from 2 to about 100, and there is present from about 0.2 to about 1 vinyl group per repeating unit;

R and $R^e$ have the same connotation as hereinbefore; and

["DH(T)P"] is the residuum of DH(T)P moieties linked through a linking residue $R^s$ so as to form a repeating unit

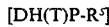

wherein DH(T)P is a residuum of a structure selected from the structures (I) and (II) so that the molecular weight $\overline{Mn}$ of said crosslinkable oligomer is in the range from about 1000 to about 10,000.

19. The PAPE oligomer of claim 18 wherein said R represents O, and said $R^e$ represents the residuum of a dihydric phenol having a chain end selected from a phenol group and a halophenyl group.

20. The PAPE oligomer of claim 19 wherein DH(T)P and $R^s$ are each residua of a dihydric phenol ("DHP") selected from the group consisting of a dihydric polynuclear phenol and a dihydric mononuclear phenol.

21. The PAPE oligomer of claim 20 wherein said polynuclear DHP is selected from the group consisting of 2,2-bis(4 hydroxyphenyl)propane; 2,2-bis(4-hydroxyphenyl)silane; diphenyl sulfone; diphenyl sulfide; diphenyl ketone and diphenyl ether; and said mononuclear DHP is a 1,4-dihydroxy benzene.

22. The PAPE oligomer of claim 21 wherein the combinations of the following DHPs are present as residua in the repeating unit:

(i) 2,2-bis(4-hydroxyphenyl)propane and diphenyl sulfone;
(ii) 2,2-bis(4-hydroxyphenyl)propane and diphenyl ketone;
(iii) 2,2-bis(4-hydroxyphenyl)propane and diphenyl ether;
(iv) diphenyl sulfone and diphenyl ketone;
(v) diphenyl ketone and diphenyl ether;
(vi) diphenyl sulfone and diphenyl ether;
(vii) diphenyl sulfone and 1,4-dihydroxy benzene;

(viii) diphenyl sulfide and diphenyl sulfone;
(ix) 2,2-bis(4-hydroxyphenyl)propane, diphenyl sulfone and 1,4-dihydroxy benzene; and,
(x) diphenyl sulfone and 1,4-dihydroxy benzene.

23. The PAPE oligomer of claim 17 wherein the backbone consists essentially of poly(2,6-dimethyl-1,4-phenylene oxide) terminated with a 2,6-dimethylphenol DMP unit, said backbone being represented by the structure:

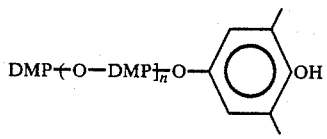

wherein n represents an integer from about 5 to about 100, and there are from 2 to about 12 pendant vinyl groups present in said backbone, and DMP represents dimethyl-substituted phenol.

24. A polyfunctionalized substantially linear crosslinkable thermoplastic polyarylene polyether oligomer, or polyarylene polythioether (PAPE) oligomer having at least two pendant ethynyl groups in said oligomer represented by a formula selected from:

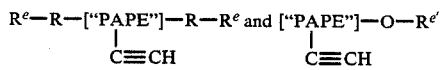

wherein,
R represents O or S in an ether linkage with $R^e$ or $R^{e'}$;
$R^e$ represents the residuum of a terminal dihydric phenol or dihydric thiophenol DH(T)P monomer having a terminal phenol, thiophenol or halophenyl group;
$R^{e'}$ represents the residuum of a terminal monohydric phenol MHP monomer having a terminal substituted phenol group;
"PAPE" represents the residuum of the PAPE oligomer which is selected from the group consisting of an oligomer of a monohydric 2,6-disubstituted phenol, and an oligomer of at least one mononuclear or polynuclear DH(T)P monomer in which oligomer each phenyl ring is connected to another through an O, Si, C or S atom; and,
the ethynyl group (—C≡CH) is connected to an electron-rich phenyl ring in the backbone of said PAPE.

25. The crosslinkable PAPE oligomer of claim 24 wherein said "PAPE" represents the residuum of said DH(T)P optionally substituted with inert substituents, so that said crosslinkable oligomer is represented by the formula:

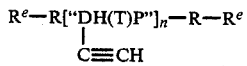

wherein, n is an integer in the range from 2 to about 100, and there is present from about 0.2 to about 1 ethynyl group per repeating unit in the oligomer's chain;
R and $R^e$ have the same connotation as hereinbefore; and,
["DH(T)P"] is the residuum of DH(T)P moieties linked through a linking residue $R^s$ so as to form a repeating unit

[DH(T)P-$R^s$]

wherein DH(T)P is a residuum of a structure selected from the structures (I) and (II) and $R^s$ represents the residuum of a reactive linking group selected from the group consisting of the same or another [DH(T)P]; a,w-dihaloalkane having from 1 to about 18 carbon atoms; phosgene; alkyl and aryl diacid halides including dihaloaryl having six carbon atoms; dihalophenyl phosphonate; bis(haloakloxy)alkane having from 3 to about 20 carbon atoms; and, dihalocycloalkanes having from 3 to 7 ring carbon atoms; so that the molecular weight $\overline{Mn}$ of said crosslinkable oligomer is in the range from about 1000 to about 100,000.

26. The PAPE oligomer of claim 24 wherein R represents O.

27. The PAPE oligomer of claim 24 wherein R represents S.

28. The PAPE oligomer of claim 24 wherein said $R^{e'}$ represents the residuum of 2,6-dimethylphenol.

29. The PAPE oligomer of claim 24 wherein said R represents O, and said $R^e$ represents the residuum of a dihydric phenol having a chain end selected from a phenol group and a halophenyl group.

30. The PAPE oligomer of claim 25 wherein said [DH(T)P] is chain extended with the residuum $R^s$ of said reactive linkage group so that said crosslinkable oligomer is represented by the formula:

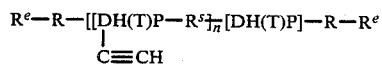

wherein, $R^s$ represents the residuum of a reactant, or, reactive solvent, which residuum links two [DH(T)P] moieties which may be the same or different.

31. The PAPE oligomer of claim 25 wherein DH(T)P and $R^s$ are each a residuum of a dihydric phenol ("DHP") selected from the group consisting of a dihydric polynuclear phenol and a dihydric mononuclear phenol.

32. The PAPE oligomer of claim 31 wherein said polynuclear DHP is selected from the group consisting of 2,2-bis(4-hydroxyphenyl)propane; 2,2-bis(4-hydroxyphenyl)silane; diphenyl sulfone; diphenyl sulfide; diphenyl ketone and diphenyl ether; and said mononuclear DHP is a 1,4-dihydroxy benzene.

33. The PAPE oligomer of claim 32 wherein the combinations of the following DHPs are present as residua in the repeating unit:
(i) 2,2-bis(4-hydroxyphenyl)propane and diphenyl sulfone;
(ii) 2,2-bis(4-hydroxyphenyl)propane and diphenyl ketone;
(iii) 2,2-bis(4-hydroxyphenyl)propane and diphenyl ether;
(iv) diphenyl sulfone and diphenyl ketone;
(v) diphenyl ketone and diphenyl ether;
(vi) diphenyl sulfone and diphenyl ether;
(vii) diphenyl sulfone and 1,4-dihydroxy benzene;
(viii) diphenyl sulfide and diphenyl sulfone;
(ix) 2,2-bis(4-hydroxyphenyl)propane, diphenyl sulfone and 1,4-dihydroxy benzene; and,
(x) diphenyl sulfone and 1,4-dihydroxy benzene.

34. The PAPE oligomer of claim 30 wherein $R^s$ is a residuum selected from the group consisting of alkenyl having from 1 to about 20 carbon atoms, dihalophenyl phosphonate, and aralkenyl having from 7 to about 27 carbon atoms.

35. The PAPE oligomer of claim 30 wherein one said dihydric phenol moiety is derived from 4,4′-isopropylidenediphenol (BPA), and another dihydric phenol moiety is derived from a dihalophenylsulfone (DHPS) having the structure:

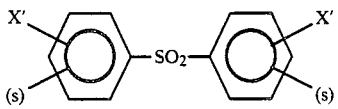

wherein,
X′ represents halogen selected from the group consisting of fluorine, chlorine, bromine and iodine; and,
(s) represents inert substituents $R^1$–$R^4$ any of which if present on remaining positions on each ring, may each be the same or different and represent alkyl having from 1 to about 18 carbon atoms, without regard for the spatial configuration such as normal, iso or tertiary; alkoxy having from 1 to about 18 carbon atoms; nitro ($NO_2$) and, hydrogen.

36. The PAPE oligomer of claim 35 wherein the backbone consists essentially of an aromatic polyether sulfone (APS) having alternating bisphenol A "BPA(s)" and diphenyl sulfone "DPS(s)" residua, said APS being terminated with phenol or halophenyl units, optionally with each of said BPA(s), DPS(s) units having substituents, represented by formulae selected from:

(Ph)BPA(s)—O-DPS(s)—O—BPA(s)—$_n$O—DPS(s)—BPA(s)(Ph)

and, (HPh)DPS(s)—O—BPA(s)—O-DPS(s)—O—BPA(s)—$_n$O—DPS(s)(HPh)

and the structures:

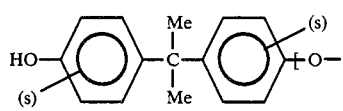

and

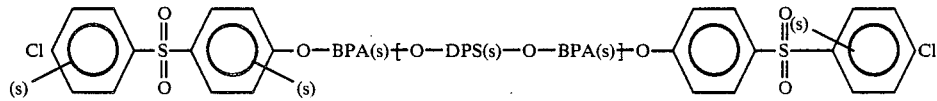

wherein, (s) represents H or $R^1$, $R^2$, $R^3$ or $R^4$;
(Ph) and (HPh) represent the phenyl and halophenyl portions of the terminal BPA(s) and DPS(s) units respectively;
$R^1$, $R^2$, $R^3$ and $R^4$ are inert substituents, any of which, if present on any phenyl ring, and $R^5$, may each be the same or different, and are selected from the group consisting of halogen, alkyl having from 1 to about 18 carbon atoms, and alkoxy having from 1 to about 18 carbon atoms, said alkyl and alkoxy being each chosen without regard for the spatial configuration of the carbon atoms; and, n represents an integer in the range from about 2 to about 10.

37. The PAPE oligomer of claim 36 wherein said $R^5$ are each methyl, and the remaining substituents are each hydrogen; and, said $\overline{Mn}$ is in the range from about 1000 to about 5000.

38. The PAPE oligomer of claim 34 wherein one said dihydric phenol moiety is derived from 4,4′-isopropylidenediphenol (BPA), and another dihydric phenol moiety is derived from a dihalophenylsulfone (DHPS).

39. The PAPE oligomer of claim 24 wherein the backbone consists essentially of poly(2,6-dimethyl-1,4-phenylene oxide) terminated with a 2,6-dimethylphenol DMP unit, said backbone being represented by the structure:

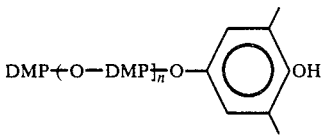

wherein n represents an integer from about 5 to about 100, and there are from 2 to about 12 pendant ethynyl groups present in said backbone, and DMP represents dimethyl-substituted phenol.

40. The PAPE oligomer of claim 24 having at least one terminal ethynyl group in addition to said pendant ethynyl groups, said oligomer being represented by a formula selected from:

and,

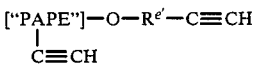

wherein,
R, $R^e$, $R^{e'}$ and "PAPE" have the same connotation as in claim 25.

41. The crosslinkable PAPE oligomer of claim 40 wherein said "PAPE" represents the residuum of said DH(T)P optionally substituted with inert substituents, so that said crosslinkable oligomer is represented by the formula:

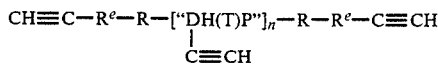

wherein, n is an integer in the range from 2 to about 100, and there is present from 0.2 to about 1 ethynyl group per repeating unit;

R and $R^e$ have the same connotation as hereinbefore; and,

["DH(T)P"] is the residuum of DH(T)P moieties linked through a linking residue $R^s$ so as to form a repeating unit

[DH(T)P-$R^s$]

wherein DH(T)P is a residuum of a structure selected from the structures (I) and (II) and $R^s$ represents the residuum of a reactive linking group selected from the group consisting of the same or another [DH(T)P]; a, w-dihaloalkane having from 1 to about 18 carbon atoms; phosgene; alkyl and aryl diacid halides including dihaloaryl having six carbon atoms; dihalophenyl phosphate; bis(haloalkoxy)alkane having from 3 to 20 carbon atoms; and, dihaloxycloalkanes having from 3 to 7 ring carbon atoms so that the molecular weight $\overline{Mn}$ of said crosslinkable oligomer is in the range from about 1000 to about 10,000.

42. The PAPE oligomer of claim 40 wherein R represents O.

43. The PAPE oligomer of claim 41 wherein said R represents O, and said $R^e$ represents the residuum of a dihydric phenol having a chain end selected from a phenol group and a halophenyl group.

44. The PAPE oligomer of claim 42 wherein DH(T)P and $R^s$ are each residua of a dihydric phenol ("DHP") selected from the group consisting of a dihydric polynuclear phenol and a dihydric mononuclear phenol.

45. The PAPE oligomer of claim 44 wherein said polynuclear DHP is selected from the group consisting of 2,2-bis(4-hydroxyphenyl)propane; 2,2-bis(4-hydroxyphenyl)silane; diphenyl sulfone; diphenyl sulfide; diphenyl ketone and diphenyl ether; and said mononuclear DHP is a 1,4-dihydroxy benzene.

46. The PAPE oligomer of claim 45 wherein the combinations of the following DHPs are present as residua in the repeating unit:
(i) 2,2-bis(4-hydroxyphenyl)propane and diphenyl sulfone;
(ii) 2,2-bis(4-hydroxyphenyl)propane and diphenyl ketone;
(iii) 2,2-bis(4-hydroxyphenyl)propane and diphenyl ether;
(iv) diphenyl sulfone and diphenyl ketone;
(v) diphenyl ketone and diphenyl ether;
(vi) diphenyl sulfone and diphenyl ether;
(vii) diphenyl sulfone and 1,4-dihydroxy benzene;
(viii) diphenyl sulfide and diphenyl sulfone;
(ix) 2,2-bis(4-hydroxyphenyl)propane, diphenyl sulfone and 1,4-dihydroxy benzene; and,
(x) diphenyl sulfone and 1,4-dihydroxy benzene.

47. The PAPE oligomer of claim 40 wherein the backbone consists essentially of poly(2,6-dimethyl-1,4-phenylene oxide) terminated with a 2,6-dimethylphenol DMP unit, said backbone being represented by the structure:

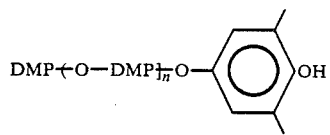

wherein n represents an integer from about 5 to about 100, and there are from 2 to about 12 ethynyl groups present in said backbone.

48. The PAPE oligomer of claim 45 wherein said DHP is chain extended with at least one —$CH_2$— group.

49. A process for forming a polyfunctionalized substantially linear crosslinkable thermoplastic polyarylene polyether oligomer, or polyarylene polythioether oligomer, (PAPE oligomer), having pendant vinyl groups in each oligomer chain, said process comprising,
(a) reacting a PAPE oligomer having a molecular weight $\overline{Mn}$ in the range from about 1000 to about 100,000, with a halomethylating agent in a first solvent for said PAPE oligomer and said halomethyalting agent, in the presence of a Lewis acid catalyst so as to introduce at least two pendant halomethyl groups on electron-rich phenyl groups in said PAPE oligomer and yield a halomethylated PAPE oligomer;
(b) reacting said halomethylated PAPE oligomer with triphenyl phosphine in solution with a second solvent, the same as or different from said first solvent, so as to yield the phosphonium salt of said halomethylated PAPE oligomer;
(c) reacting said phosphonium salt with a lower aliphatic aldehyde in the presence of aqueous alkali and an organic phase solvent for said phosphonium salt so as to yield at least two pendant vinyl groups on the backbone of said PAPE oligomer;
(d) precipitating said polyfunctionalized PAPE oligomer from said organic phase; and,
(e) recovering said polyfunctionalized PAPE oligomer.

50. The process of claim 49 wherein said polyfunctionalized PAPE oligomer is represented by a formula in claim 1.

51. The process of claim 50 wherein said polyfunctionalized PAPE oligomer has a backbone consisting essentially of an aromatic polyether sulfone or aromatic polythioether sulfone oligomer ("APS") represented by the formula given in claim 14.

52. The process of claim 50 wherein said polyfunctionalized PAPE oligomer has a backbone consisting essentially of poly(2,6-dimethyl-1,4-phenylene oxide).

53. The process of claim 50 wherein step (a) is carried out at a temperature in the range from about room temperature to about the reflux temperature of said first solvent; said Lewis acid is tin tetrachloride; and said halomethylating agent is 1 chloromethoxy-4-chlorobutane.

54. The process of claim 50 wherein step (b) is carried out in the presence of a phase transfer catalyst at a temperature in the range from about room temperature to about the reflux temperature of said second solvent.

55. The process of claim 49 in which said PAPE oligomer has phenol terminal groups as the chain ends, and prior to step (a), reacting said PAPE oligomer with an α-aralkyl compound in an organic solvent in the presence of concentrated aqueous alkali metal hydroxide solution and a phase transfer catalyst at a temperature below the reflux temperature of the solvent, so that said poylfunctionalized oligomer has terminal vinyl groups in addition to pendant vinyl groups.

* * * * *